(12) United States Patent
Nakahara

(10) Patent No.: US 6,470,150 B2
(45) Date of Patent: Oct. 22, 2002

(54) DISTANCE MEASURING APPARATUS

(75) Inventor: Naoto Nakahara, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/785,184

(22) Filed: Feb. 20, 2001

(65) Prior Publication Data

US 2001/0024571 A1 Sep. 27, 2001

(30) Foreign Application Priority Data

Feb. 17, 2000 (JP) .......................................... 2000-39931

(51) Int. Cl.[7] .................................................. G03B 13/36

(52) U.S. Cl. ........................................ 396/121; 396/234

(58) Field of Search ................................ 396/121, 122, 396/123, 100, 104, 229, 228, 96, 125, 89, 233, 234

(56) References Cited

U.S. PATENT DOCUMENTS 5,027,148 A * 6/1991 Anagnostopoulos ......... 396/96

* cited by examiner

Primary Examiner—W. B. Perkey
(74) Attorney, Agent, or Firm—Greenblum & Bernstein, P.L.C.

(57) ABSTRACT

A distance measuring apparatus for a camera, having a photometering device, includes a light receiving device including distance measuring zones defined by at least part of a plurality of photometering zones, and at least one array of photoelectric conversion elements, wherein each of the photoelectric conversion elements converts light received thereon into an electric charge and accumulates the electric charge so that each of the accumulated electric charges is output in order from each photoelectric conversion element as an analog picture signal of the light receiving device; an A/D converter which converts the analog picture signal into digital image data; a transformation range setting device which sets a transformation range corresponding to photometering data of the photometering zones that overlap the distance measuring zones; and a logarithmic transformation device which performs logarithmic transformation on the digital image data at the transformation range to obtain sensor data.

10 Claims, 12 Drawing Sheets

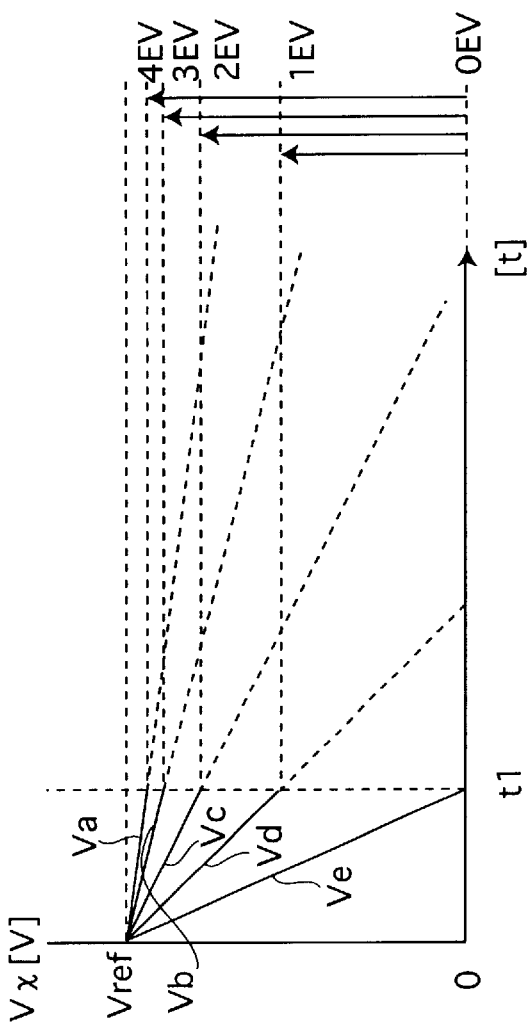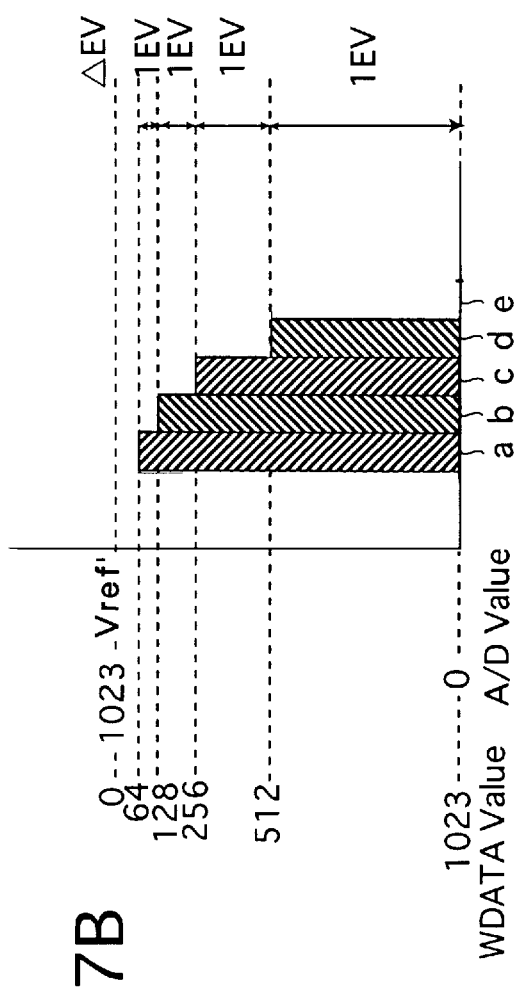
Fig. 7A
Fig. 7B

DISTANCE MEASURING APPARATUS

BACKGROUND OF THE INVENTION

1. Field of the Invention

The present invention relates to a passive-type distance measuring apparatus that is provided with a distance measuring sensor which converts incident light into an analog signal.

2. Description of the Related Art

A conventional passive-type distance measuring apparatus, which is widely used as a passive-type AF system for AF cameras, divides the image viewed through a predetermined distance measuring zone (e.g., a focus detection zone in the case of an AF camera) into two images via a pair of separator optical systems, to be respectively formed as two separate images (right and left images) on a corresponding pair of line sensors (right and left sensors). Each line sensor includes an array of photodiodes (an array of photoelectric conversion elements). Each photodiode converts the received light into an electric charge and accumulates (integrates) the electric charge. Thereafter, the accumulated electric charges are read out of each photodiode, in order, as a picture signal (voltage). In accordance with the picture signals output from the pair of line sensors, a predetermined distance measuring process is performed to obtain data such as the amount of defocus or the object distance that is necessary for bringing the object into focus. However, in the case where this passive-type distance measuring apparatus uses a distance measuring sensor which converts the incident light into an analog picture signal, an accurate calculated distance value/amount of defocus cannot be attained by merely converting an analog picture signal output from the distance measuring sensor into a digital signal and using the digital signal in a predetermined distance measuring calculation if the brightness and/or the contrast of an object is low due to, for example, the resolving power of a low brightness portion of the digital signal being low, so that the accuracy of measurement deteriorates.

SUMMARY OF THE INVENTION

It is an object of the present invention to provide a distance measuring apparatus in which the accuracy of measurement can be increased and the time necessary for measurement can be shortened.

To achieve the object mentioned above, according to an aspect of the present invention, a distance measuring apparatus for a camera is provided, having a photometering device which can measure the brightness of an object in each of a plurality of photometering zones, including a light receiving device including distance measuring zones defined by at least a part of the photometering zones, and at least of one array of photoelectric conversion elements, wherein each of the photoelectric conversion elements converts light received thereon into an electric charge and accumulates the electric charge so that each of the accumulated electric charges is output in order from each photoelectric conversion element as an analog picture signal of the light receiving device; an A/D converter which converts the analog picture signal into digital image data; a transformation range setting device which sets a transformation range corresponding to photometering data of the photometering zones that overlap the distance measuring zones; and a logarithmic transformation device which performs logarithmic transformation on the digital image data at the transformation range to obtain sensor data.

Preferably, the distance measuring apparatus further includes an integration control device which causes the photoelectric conversion elements to commence an integration process and terminates the integration of all the photoelectric conversion elements when any one of the integral values of the photoelectric conversion elements reaches a predetermined integration completion value, so that the integral value at the termination of the integration process can be output as the analog picture signal.

The transformation range setting device determines maximum and minimum values of the photometering data of the photometering zones that overlap the distance measuring zones, and sets the transformation range in accordance with a difference between the maximum and minimum values.

Preferably, the transformation setting device reduces the transformation range as the difference between the maximum and minimum values is decreased.

Preferably, the transformation range setting device sets the transformation range while the integration process is carried out by the light receiving device.

In an embodiment, the light receiving device is arranged so that each of the distance measuring zones overlaps at least a portion of a corresponding photometering zone.

In an embodiment, the light receiving device is arranged so that each of the distance measuring zones overlaps the center portion of a corresponding photometering zone.

Preferably, distance measuring apparatus for further includes a calculation device which calculates an object distance based on the sensor data.

According to another aspect of the present invention, a camera is provided, including a photometering device which can measure the brightness of an object in a plurality of photometering zones; a light receiving device including a plurality of distance measuring zones defined by at least a part of the photometering zones, and at least one array of photoelectric conversion elements, wherein each of the photoelectric conversion elements converts light received thereon into an electric charge and accumulates the electric charge so that each of the accumulated electric charges is output in order from each photoelectric conversion element as an analog picture signal of the light receiving device; an A/D converter which performs A/D conversion of the analog picture signal to obtain digital image data; a transformation range setting device which sets a transformation range corresponding to photometering data of the photometering zones that overlap the distance measuring zones; a logarithmic transformation device which performs logarithmic transformation on the digital image data at the transformation range to obtain sensor data; and a calculation device which calculates an object distance based on the sensor data.

The present disclosure relates to subject matter contained in Japanese Patent Application No. 2000-39931 (filed on Feb. 17, 2000) which is expressly incorporated herein by reference in its entirety.

BRIEF DESCRIPTION OF THE DRAWINGS

The present invention will be described below in detail with reference to the accompanying drawings in which:

FIG. 7A is a graph showing the relationship between a picture signal ($V_\chi$) output from the phase-difference distance measuring sensor shown in FIG. 5 and time (t), by way of example;

FIG. 7B is a graph showing digital image data, wherein analog picture signals Va through Ve output from the phase-difference distance measuring sensor shown in FIG. 5 at the time 't1' are converted into the digital image data on the photodiodes 'a' through 'e' in the range of 0 (V) to Vref, respectively;

DESCRIPTION OF THE PREFERRED EMBODIMENTS

Figure 1:
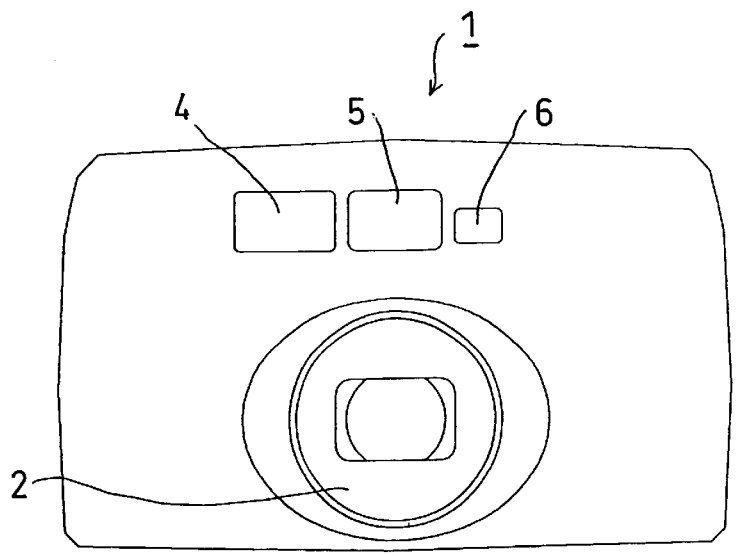
FIG. 1 is a front view of an embodiment of a lens-shutter camera having a distance measuring device according to the present invention.
Figure 2:
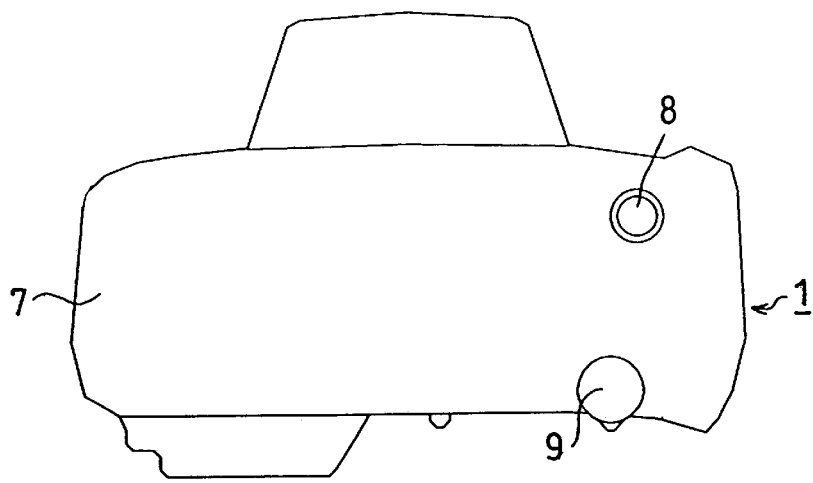
FIG. 2 is a plan view of the lens-shutter camera shown in FIG. 1.
Figure 3:
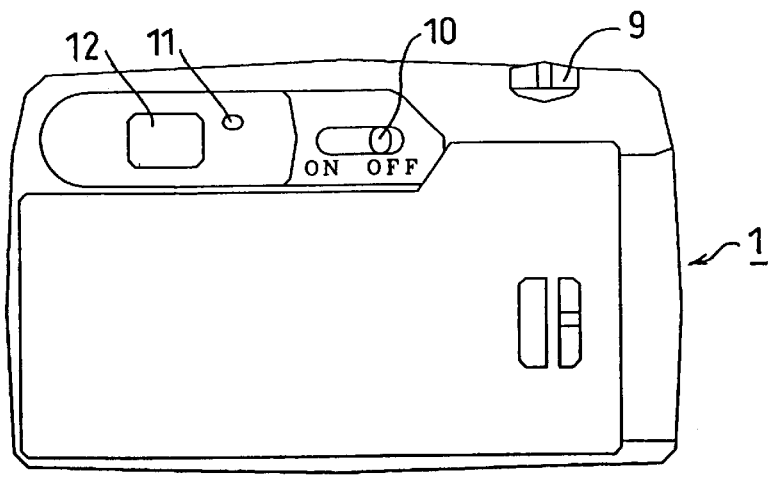
FIG. 3 is a rear view of the lens-shutter camera shown in FIG. 1.

FIGS. 1 through 3 show an embodiment of a lens-shutter AF camera according to the present invention. A camera 1 is provided on the front thereof with a zoom lens 2. The camera 1 is provided on the front thereof above the zoom lens 2 with a passive AF light receiving window 4, a viewfinder window 5 and a photometering window 6. The camera 1 is provided therein behind the passive AF light receiving window 4, the viewfinder window 5, and the photometering window 6 with a distance measuring sensor (passive AF sensor) 36 (see FIG. 6), a viewfinder optical system (not shown) and a photometering sensor 37a (see FIG. 4), respectively.

The camera 1 is provided on a top panel 7 thereof with a release button 8. The release button 8 is interconnected with a photometering switch SWS and a release switch SWR (see FIG. 4) so that the photometering switch SWS and the release switch SWR are turned ON if the release button 8 is depressed by a half step and a full step, respectively.

The camera 1 is provided at a rear upper center position thereof with a main switch knob 10 that is interconnected with a main switch (power switch) SWM (see FIG. 4) so that the main switch SWM is turned ON and OFF if the main switch knob 10 is moved left and right, respectively, as viewed in FIG. 3. The camera 1 is provided at a rear upper right position thereof with a zooming knob 9 which is manually operated to drive the zoom lens 2 in a telephoto direction or a wide-angle direction. The zooming knob 9 is interconnected with a telephoto switch SWT and a wide-angle switch SWW (see FIG. 4) so that the telephoto switch SWT and the wide-angle switch SWW are turned ON if the zooming knob 9 is moved to a telephoto side (e.g., the right side as viewed in FIG. 3) and a wide-angle side (e.g., the left side as viewed in FIG. 3), respectively. Each of the telephoto switch SWT and the wide-angle switch SWW is turned OFF when the zooming knob 9 is in a neutral position shown in FIGS. 2 and 3. The camera 1 is provided at a rear upper left position thereof with an eyepiece window 12. The camera 1 is provided, on the rear thereof in the vicinity of the eyepiece window 12, with a green light emitter (e.g., a green LED) 11. The green light emitter 11 is controlled to light up or flash ON and OFF (blink) depending on the result of distance measurement.

Figure 4:
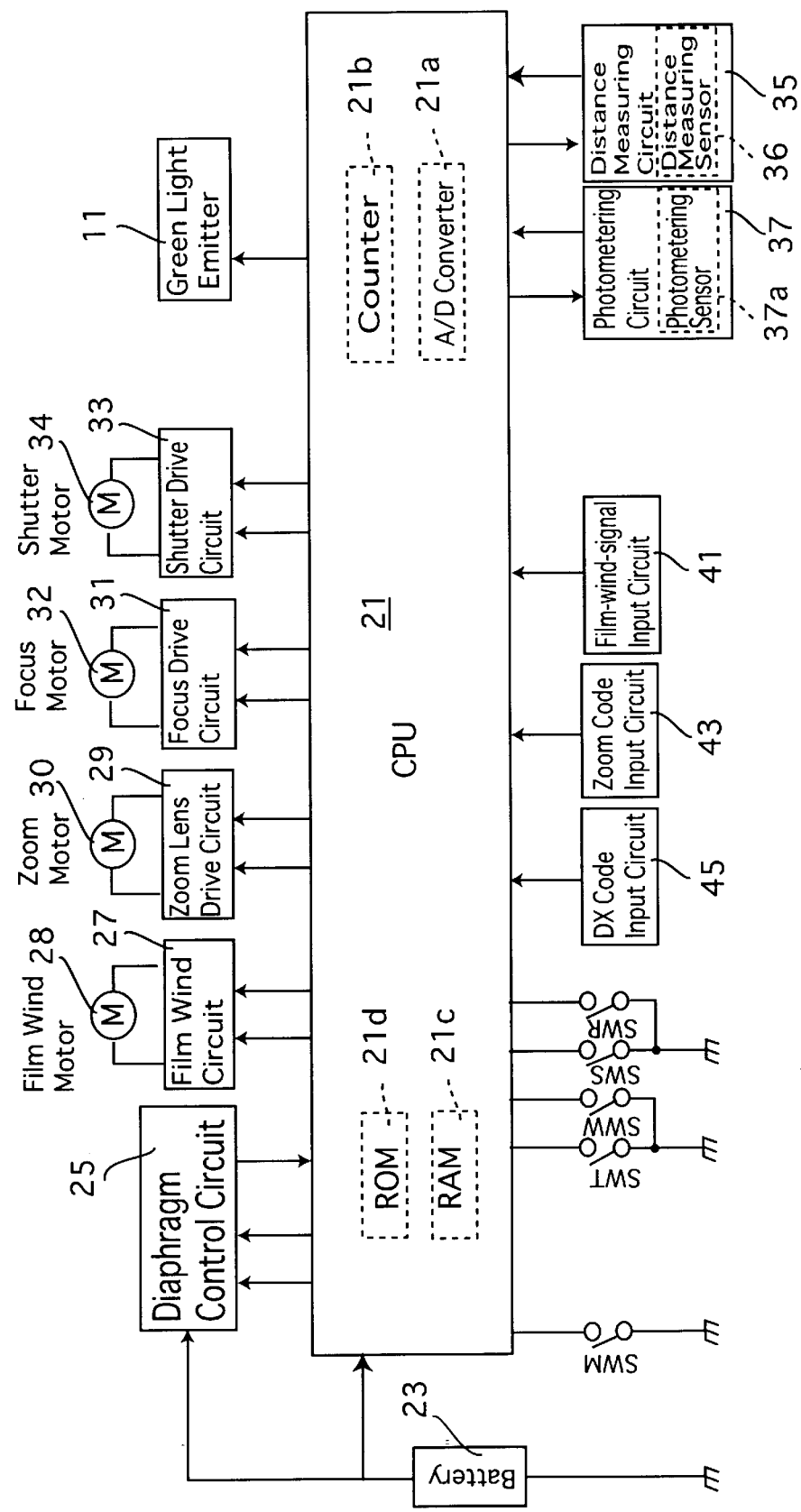
FIG. 4 is a block diagram of fundamental elements of a control system provided in the lens-shutter camera shown in FIG. 1.

Fundamental elements of a control system of the camera 1 will be hereinafter discussed in detail with reference to FIG. 4. The control system includes the green light emitter 11, a CPU (logarithmic transformation device/transformation range setting device/integration control device/calculation device) 21, a battery 23, a diaphragm control circuit 25, a film wind circuit 27, a zoom lens drive circuit 29, a focus drive circuit 31, a shutter drive circuit 33, a distance measuring circuit 35 and a photometering circuit (photometering device) 37. The control system further includes a film-wind-signal input circuit 41, a zoom code input circuit 43, a DX code input circuit 45, the photometering switch SWS, the release switch SWR, the telephoto switch SWT, the wide-angle switch SWW, and the main switch SWM. The control system further includes a film wind motor 28, a zoom motor 30, a focus motor 32, and a shutter motor 34 which are connected to the film wind circuit 27, the zoom lens drive circuit 29, the focus drive circuit 31 and the shutter drive circuit 33, respectively. The CPU 21 is provided therein with an A/D converter 21a, a counter 21b, a RAM 21c, and a ROM 21d. Various parameters for determining control or calculation are temporarily stored in the RAM 21c, while programs for various functions of the camera 1 are written in the ROM 21d. The CPU 21 comprehensively controls the overall operations of the camera body 1.

The main switch SWM (which is interconnected with the main switch knob 10), the telephoto switch SWT and the wide-angle switch SWW (which are both interconnected with the zooming knob 9), and the photometering switch SWS and the release switch SWR (which are both interconnected with the release button 8), are electrically connected to the CPU 21.

Upon the main switch SWM being turned ON, the CPU 21 starts supplying power from the battery 23 to peripheral circuits which are connected to input/output ports of the CPU 21 to perform operations corresponding to operations of the various above-mentioned switches.

Upon the telephoto switch SWT being turned ON, the CPU 21 starts driving the zoom motor 30 via the zoom lens drive circuit 29 to move the zoom lens 2 in a telephoto direction. Likewise, upon the wide-angle switch SWW being turned ON, the CPU 21 starts driving the zoom motor 30 via the zoom lens drive circuit 29 to move the zoom lens 2 in a wide-angle direction. The focal length of the zoom lens 2 and the axial position thereof are detected by the zoom code input circuit 43. Upon the main switch SWM being turned ON, the CPU 21 controls the zoom motor 30 to keep rotating forwardly until the zoom lens 2 advances to the wide-angle extremity thereof. Upon the main switch SWM being turned OFF, the CPU 21 controls the zoom motor 30 to keep rotating reversely until the zoom lens 2 retracts into the retracted position thereof, at which the zoom lens 2 is fully retracted in the camera body.

The CPU 21 calculates an object brightness via the photometering circuit 37 upon the photometering switch SWS being turned ON. The photometering circuit 37 is provided with a photometering sensor 37a for receiving light from the object through the photometering window 6. The photometering circuit 37 outputs a photometric signal which corresponds to the object brightness to the CPU 21.

Figure 5:
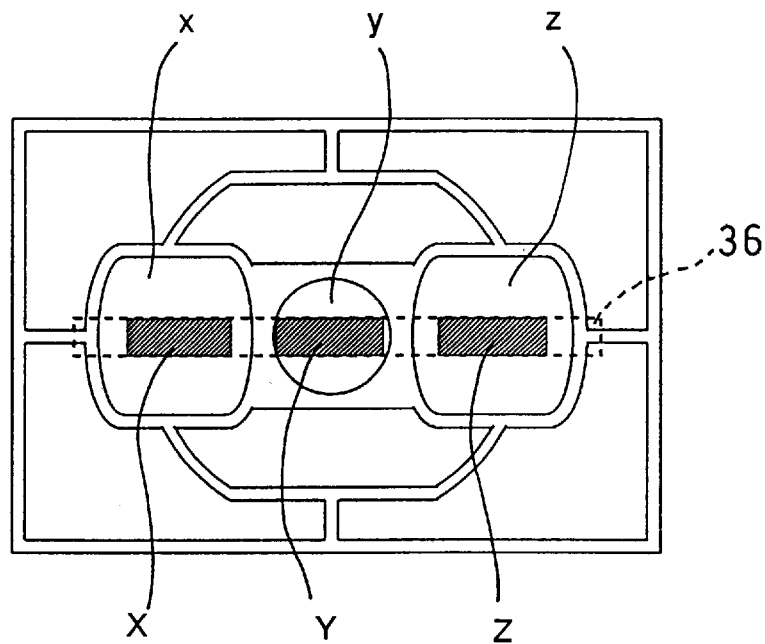
FIG. 5 is schematic view showing a relationship between photometering zones and distance measuring zones in the lens-shutter camera shown in FIG. 1.

The photometering sensor 37a is provided with a multi-segment photometering sensor, so that the camera measures and compares photometric readings in segmented areas of the photographic field. In the illustrated embodiment, the photographic field is divided into nine photometering zones, as shown in FIG. 5. Among the nine photometering zones, three photometering zones 'x', 'y', and 'z' are provided with portions overlapping the distance measuring zones 'X', 'Y', and 'Z', respectively. Namely, approximate brightness values (average brightness values) of the object in the distance measuring zones 'X', 'Y', and 'Z' can be obtained, based on the photometric readings (photometering data) of the three photometering zones 'x', 'y', and 'z'.

Thereafter, the CPU 21 performs an AE calculation process in accordance with the calculated object brightness, and the ISO film speed input via the DX code input circuit 45, to calculate the optimum shutter speed and the optimum aperture value. The DX code input circuit 45 reads DX code printed on a film cartridge (not shown) loaded in the camera body 1 to output the ISO film speed, the number of exposures, and other information on the loaded film to the CPU 21.

The CPU 21 performs a predetermined image process for processing an analog picture signal input from the distance measuring circuit 35, and subsequently performs a distance measuring calculation in accordance with the processed picture signal. If the calculated distance value (amount of defocus) obtained by the distance measuring calculation is effective, the CPU 21 calculates the amount of driving of the focus motor 32 (LL data) for driving a focusing lens group (not shown) of the zoom lens 2 to drive the focus motor 32 via the focus drive circuit 31, and at the same time, the CPU 21 turns ON the green light emitter 11. If the calculated distance value is not effective, the CPU 21 makes the green light emitter 11 to flash ON and OFF (blink) to inform the user that the distance measuring calculation ended in failure.

Figure 6:
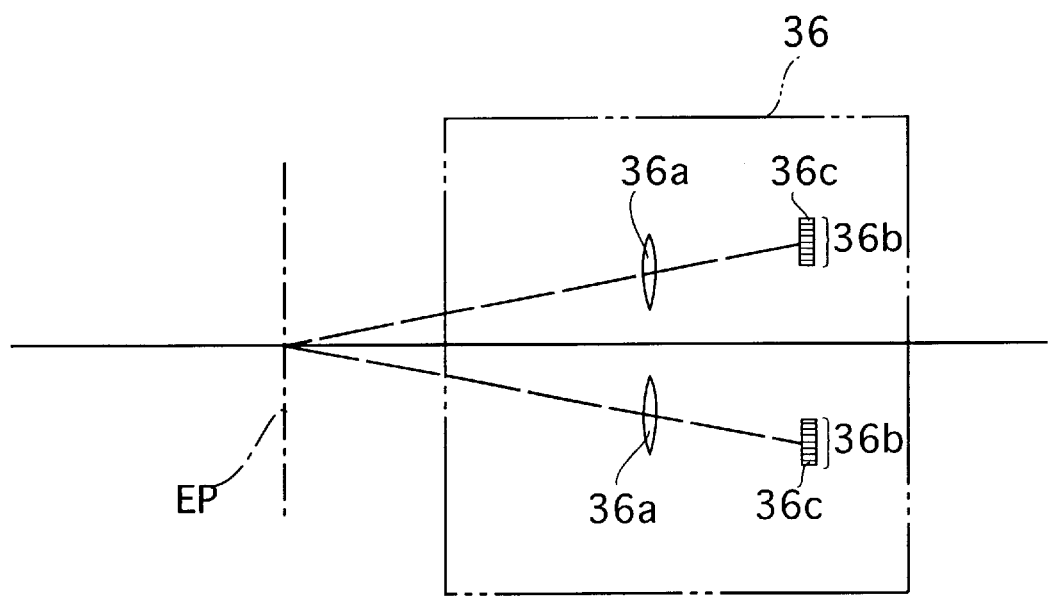
FIG. 6 is a schematic diagram of a phase-difference distance measuring sensor provided in the lens-shutter camera shown in FIG. 1.

The distance measuring circuit 35 detects a focus state of the object image formed within a distance measuring zone (a focus detection zone) of the photographic field. The distance measuring circuit 35 is provided with the distance measuring sensor (light receiving device) 36 which converts the received object light into an electrical picture signal (electric charges) and to output the picture signal. FIG. 6 shows a schematic structure of the distance measuring sensor 36. The distance measuring sensor 36, which is disposed behind the passive AF light receiving window 4, is provided with a pair of separator lenses 36a and a corresponding pair of line sensors 36b. In FIG. 6, 'E' represents a focal plane which is optically equivalent to a film plane (picture plane). The image observed through the distance measuring zone is divided into two by the pair of separator lenses to be formed as two separate images on the corresponding pair of line sensors 36b. Each line sensor 36b is provided with an array of photodiodes (photoelectric conversion elements) 36c. Each photodiode 36c of each line sensor 36b receives the split object light bundles, converts the light into an electric charge and accumulates (integrates) the electric charges. The electric charges obtained by the integration process at each photodiode 36c of each line sensor 36b are successively converted to a voltage for each pixel and is output as a picture signal for each pixel to the main CPU 21.

In the illustrated embodiment, the line sensor 36b is formed so as to measure the distance of the objects in the three distance measuring zones 'X', 'Y', and 'Z' (see FIG. 5). The CPU (integration control device) 21 terminates the integration of all the photodiodes 36c and inputs the picture signals at the same time, when the integral value of any one of the photodiode 36c reaches a predetermined integration completion value.

The distance measuring circuit 35 is provided with a monitor sensor (not shown) for monitoring the value of the integrated electric charges. The CPU 21 completes the integration process of the pair of line sensors 36b when the integral value of the monitor sensor reaches a predetermined value.

Upon the release switch SWR being turned ON, the CPU 21 controls the diaphragm control circuit 25 to stop down the diaphragm of the zoom lens 2 in accordance with the determined aperture value. At the same time, the CPU 21 actuates the shutter motor 34 to release the shutter via the shutter control circuit 33 in accordance with the determined shutter speed.

Upon completion of an exposure, the CPU 21 drives the film wind motor 28 to rotate forwardly via the film wind circuit 27 to wind the film by one frame while a film wind signal is input via the film-wind-signal input circuit 41. However, after the last frame of the film is exposed, the CPU 21 drives the film wind motor 28 to rotate reversely via the film wind circuit 27 to rewind the film.

In addition to the aforementioned fundamental elements, the camera 1 is further provided with various known devices such as a self-timer light indicator which indicates that the self timer is in operation, a flashlight emitter which emits flashlight under control of the CPU 21, and an LCD panel which indicates various photographic information.

FIG. 7A is a graph showing the relationship between a picture signal $V_\chi$ (voltage: Va, Vb, Vc, Vd or Ve) output from the corresponding photodiode 36c (a, b, c, d or e) on each line sensor 36b of the distance measuring sensor 36, and time (t), by way of example. In FIG. 7A, 'Vref' represents the reference voltage. As time elapses, the voltage of the picture signal $V_\chi$ descends from the reference voltage Vref by the amount of charges integrated by each photodiode 36c. The CPU 21 controls each photodiode of each line sensor 36b to stop integrating charges at the time the voltage of the picture signal $V_\chi$ (Va, Vb, Vc, Vd or Ve) output from either line sensor reaches zero volts (0V), or a predetermined maximum integration time elapses. Zero volts (0V) is herein determined as the integration completion value (voltage). As the object brightness becomes higher, the time necessary for the voltage of the picture signal $V_\chi$ to reach the integration completion value becomes shorter. Accordingly, it can be understood from FIG. 7A that the inclination of the line showing the voltage of the picture signal $V_\chi$ is in proportion to the object brightness, and the greater the absolute value of the inclination of the line showing the picture signal $V_\chi$, the higher the object brightness.

In FIG. 7A, a picture signal Ve of the highest brightness is determined as a reference value (0EV), while EV values (0EV through 4EV in FIG. 7A) are determined as values which vary relative to the picture signal Ve, so that the greater the picture signal $V_x$, i.e., the lower the object brightness, the greater the EV value. In FIG. 7A, five picture signals Va, Vb, Vc, Vd and Ve are indicated in increments of 1EV.

The integration completion time of the picture signal Ve, the integrating operation of which completes first in FIG. 7A, is determined as time t1, while digital image data on the photodiodes 'a' through 'e', which are respectively obtained by converting the picture signals Va through Ve into a 10-bit digital form at the time t1 in the range of 0 (V) to Vref, are indicated in FIG. 7B. Note that Vref' (10-bit reference voltage value Vref) shown in FIG. 7B is the 10-bit converted form of Vref shown in FIG. 7A. In FIG. 7B, the difference value $\Delta$ EV obtained by a formula '$\Delta$ EV=$\log_2$ (Vref'-A/D value)' indicates the difference of the brightness value between Vref' and each digital image data. Note that the difference value $\Delta$ EV in the range of 0 (V) to Vref' corresponds to $\Delta$ 10EV. Table 1 shows the relationship between the difference value $\Delta$ EV and each digital image data (A/D value).

TABLE 1

| Photodiode | A/D value | Vref'- A/D value | $\Delta$ EV |
| --- | --- | --- | --- |
| a | 959 | 64 | 6 |
| b | 895 | 128 | 7 |
| c | 767 | 256 | 8 |
| d | 511 | 512 | 9 |
| e | 0 | 1023 | 10 approx. |

Figure 7D:
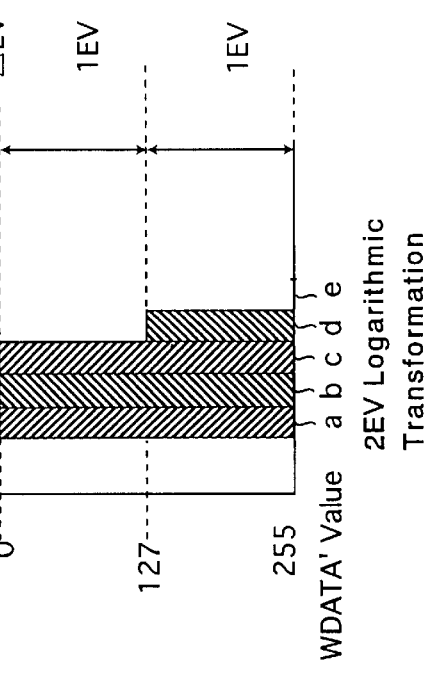
FIGS. 7C, 7D and 7E are graphs showing 4EV sensor data, 2EV sensor data, and 1EV sensor data, respectively, wherein a logarithmic transformation is performed for each of the digital image data on the photodiodes 'a' through 'e' shown in FIG. 7B.
Figure 7C:
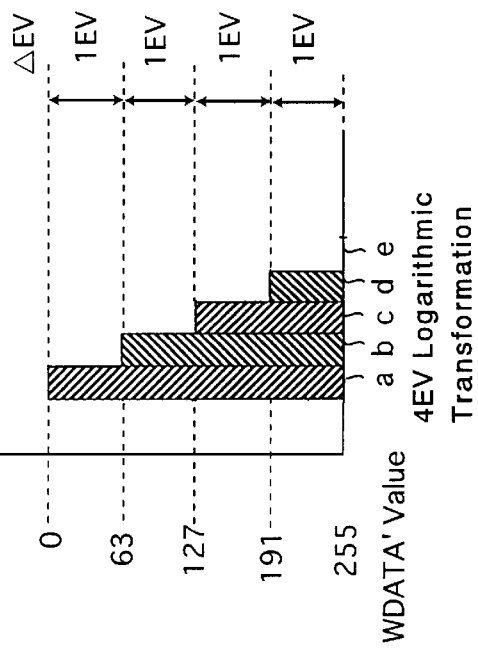

FIG. 7C is a bar graph showing sensor data (4EV sensor data), wherein a logarithmic transformation (hereinafter referred to as '4EV logarithmic transformation') is performed for each of the digital image data on the photodiodes 'a' through 'e' to obtain the 4EV sensor data by converting each of the digital image data on the photodiodes 'a' through 'e' into a corresponding 8-bit data (0 through 255 steps) while dividing 1EV into 64 steps. FIG. 7D is a bar graph showing sensor data (2EV sensor data), wherein a logarithmic transformation (hereinafter referred to as '2EV logarithmic transformation') is performed for each of the digital image data on the photodiodes 'a' through 'e' to obtain the 2EV sensor data by converting each of the digital image data on the photodiodes 'a' through 'e' into a corresponding 8-bit data (0 through 255 steps) while dividing 1EV into 128 steps.

In the digital image data (FIG. 7B), the resolving power of a low brightness portion is lower than that of a high brightness portion. Therefore, the digital image data is subject to a logarithmic transformation in a predetermined transformation range to average the resolving power, so that sensor data can be obtained. Consequently, the calculation to measure the object distance is carried out based on the sensor data. If no appropriate object distance is obtained in this calculation, it is possible to carry out again the logarithmic transformation after changing the transformation range, whereby the object distance determination calculation can be performed again, based on the sensor data thus obtained. However, in this case, the time spent in the first calculation to measure the object distance is wasteful. In particular, if the distance measuring processes are carried out for the plural distance measuring zones, it is necessary to perform a plurality of logarithmic transformations and a plurality of distance measuring calculations until a correct object distance is obtained by the calculation for each distance measuring zone, since in general, the brightness values of the distance measuring zones are not identical.

In view of this problem, in the illustrated embodiment, an appropriate logarithmic transformation range is set corresponding to a difference in the brightness difference of the photometering zones which overlap the distance measuring zones. It should be appreciated that the brightness difference of the photometering zones overlapping the distance measuring zones is used as a criterion to set the appropriate logarithmic transformation range, because the logarithmic transformation range can be appropriately set by obtaining the values of the object brightness in each distance measuring zone, i.e., the size of the digital image data of each distance measuring zone, based on the brightness difference of the photometering zones.

Specifically, the maximum value corresponding to the highest brightness and minimum value corresponding to the lowest brightness are chosen from the brightness values (photometering data) of the photometering zones 'x', 'y', and 'z' that overlap the distance measuring zones 'X', 'Y', and 'Z'. Thereafter, a difference (brightness difference) between the maximum value and the minimum value is set as a reference level XEV, so that the logarithmic transformation is carried out at the logarithmic transformation range corresponding to the reference level XEV.

For example, if the reference level XEV is greater than 2EV, it is assumed that the average brightness difference of the distance measuring zones 'X', 'Y', and 'Z' is large, and that the difference of the digital image data of the distance measuring zones is large. On this assumption, 4EV logarithmic transformation is performed to enhance the resolving power of the low brightness portion (FIG. 7C). In this example, although the resolving power of the high brightness portion is reduced as a result of the 4EV logarithmic transformation, sensor data having high contrast can be obtained for each distance measuring zone 'X', 'Y', and 'Z'.

If the reference level XEV is greater than 1EV but not greater than 2EV, there is a possibility that if the 4EV logarithmic transformation is performed, the resolving power of the high brightness portion is too small with respect to the resolving power of the low brightness portion, and hence the 2EV logarithmic transformation is carried out (FIG. 7D). When the transformation range is 2EV (smaller than 4EV), the resolving power of the high brightness portion is substantially identical to the resolving power of the low brightness portion. Consequently, sensor data having high contrast can be obtained for each distance measuring zone 'X', 'Y', and 'Z'.

Figure 7E:
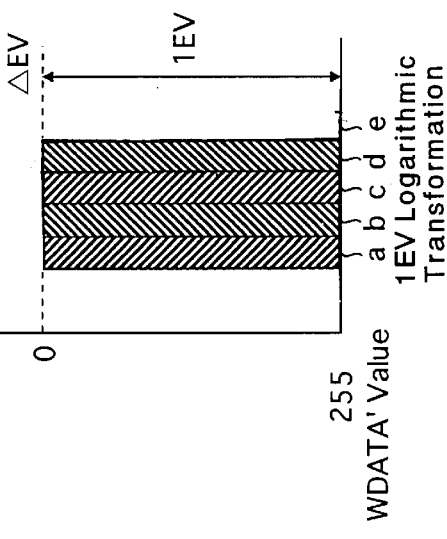

If the reference level XEV is not greater than 1EV, the average brightness difference of the distance measuring zones 'X', 'Y' and 'Z' is small, and accordingly, the 1EV logarithmic transformation is performed (FIG. 7E). When the transformation range is 1EV (smaller than 2EV), the resolving power of the high brightness portion is high, so that sensor data having high contrast can be obtained for each distance measuring zone 'X', 'Y', and 'Z'.

Since the distance measuring calculation is carried out based on the sensor data of high contrast thus obtained, not only can the accuracy of the distance measurement be enhanced, but also the calculation time can be reduced since it is not necessary to repeatedly carry out the logarithmic transformation and the distance measuring calculation.

Figure 8B:
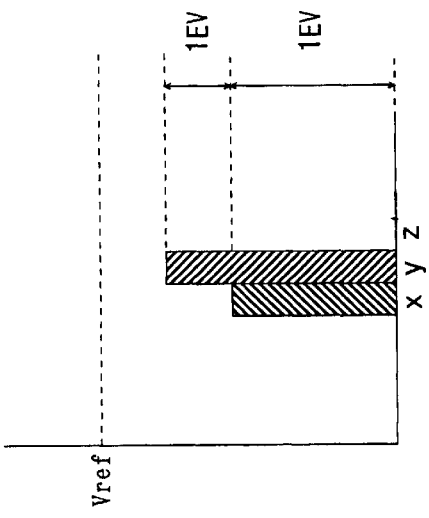
FIGS. 8A through 8C are explanatory views of processes to set a transformation range in accordance with an output of a photometering sensor of the lens-shutter camera shown in FIG. 1.
Figure 8C:
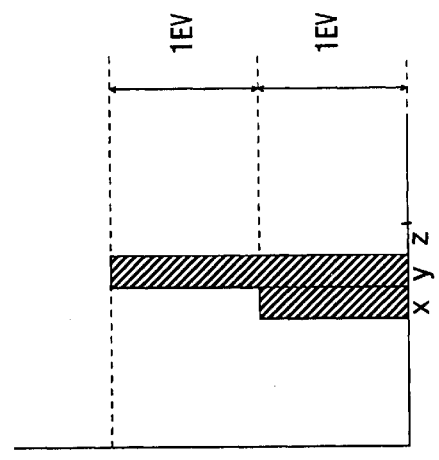
Figure 8A:
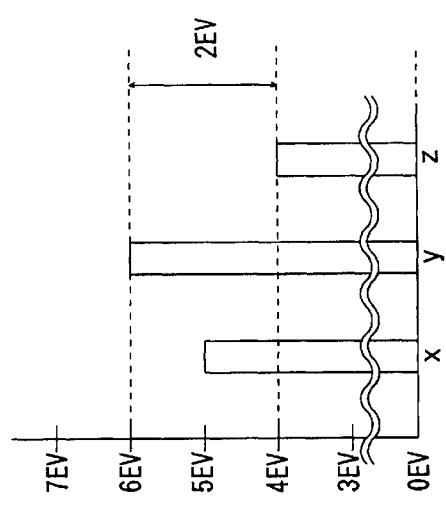

FIG. 8A shows an example of photometering data output from the photometering sensor 37a. In this example, the maximum value and the minimum value of the photometering data of the photometering zone overlapping the distance measuring zones are 6eV (photometering data b) and 4eV (photometering data c), respectively, and the reference level XEV is 2EV. Consequently, the digital image data (FIG. 8B) obtained by A/D conversion is subject to the 2EV logarithmic transformation to obtain 2EV sensor data (FIG. 8C).

In the illustrated embodiment, the maximum value and the minimum value are obtained from among the photometering data of the photometering zones overlapping the distance measuring zones, and the difference (brightness difference) between the maximum and minimum values is used as the reference level XEV, so that the logarithmic transformation range is set based on the reference level XEV. However, the present invention is not limited to this arrangement. For example, it is possible to set the logarithmic transformation range for each distance measuring zone, based on each brightness value of the photometering zones that overlap the distance measuring zones. Moreover, although the 4EV logarithmic transformation, 2EV logarithmic transformation or 1EV logarithmic transformation is carried out in accordance with the value of the reference level XEV in the illustrated embodiment, the logarithmic transformation ranges to be set, and the number of the logarithmic transformation ranges, are not limited thereto. Note that the digital image data obtained by the A/D conversion and the sensor data having been subjected to the logarithmic transformation is temporarily written and stored in the RAM 21c.

Figure 9:
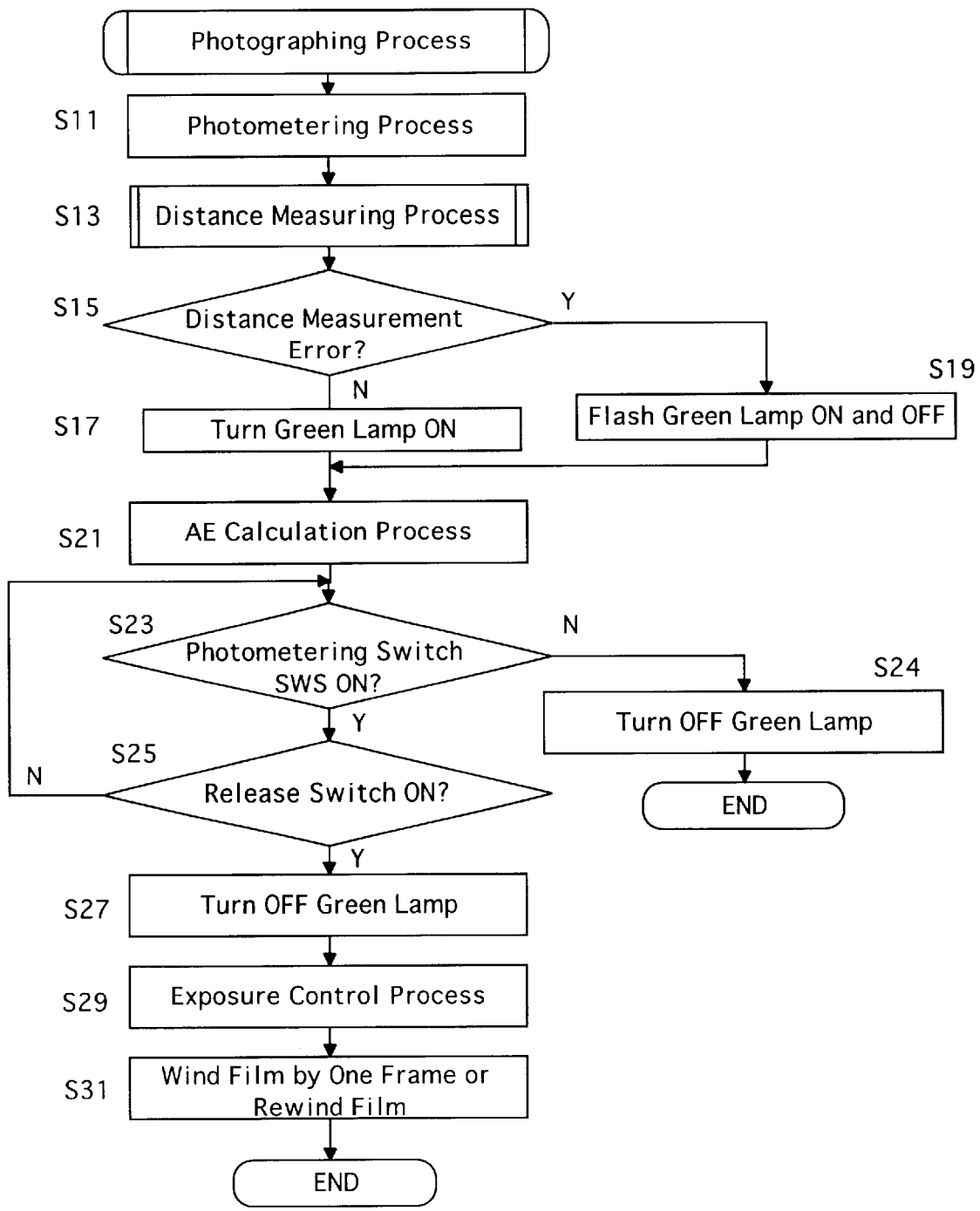
FIG. 9 is a flow chart showing the photographing process of the lens-shutter camera shown in FIG. 1.

The operation of the camera 1 will be hereinafter discussed with reference to flow charts shown in FIGS. 9 through 13. FIG. 9 is a flow chart showing the photographing process of the camera 1. This process is performed upon the photometering switch SWS being turned ON.

In the photographing process, the photometering process and the distance measuring process are carried out (S11; S13). In the photometering process, the object brightness (photometering data) in the entire picture plane and in each photometering zone that overlaps each distance measuring zone is determined. In the distance measuring process, the calculated distance value of the object is obtained for each distance measuring zone and if an appropriate distance value which meets the predetermined conditions is obtained, the focusing motor 30 is driven in accordance with the calculated distance value. Note that the photometering data thus obtained is stored in the RAM 21c.

After the distance measuring process is performed at step S13, it is determined whether a distance measurement error flag is 1 (step S15). If the distance measurement error flag is set to 1 (i.e., if an appropriate calculated distance value cannot be obtained in the distance measuring process), control proceeds to step S19 at which the green light emitter 11 is controlled to flash ON and OFF (blink) so as to warn the user. If the distance measurement error flag is set to 0, control proceeds to step S17 at which the green light emitter 11 is controlled to light up. Subsequently, an AE calculation process is performed (step S21). In the AE calculation process, the optimum shutter speed and the optimum aperture value are calculated in accordance with the object brightness in the entire picture plane, ISO film speed input via the DX code input circuit 45, and other factors.

Subsequently, it is determined whether the photometering switch SWS is ON (step S23). If the photometering switch SWS is not ON, the green light emitter 11 is turned OFF (step S24), and then control ends. If the photometering switch SWS is ON, it is determined whether the release switch is ON (step S25). If it is determined at step S25 that the release switch is not ON, control returns to step S23 to wait for either the photometering switch SWS to be turned OFF or the release switch SWS to be turned ON. Upon the release switch SWR being turned ON, the green light emitter 11 is turned OFF (step S27). Subsequently, an exposure control process in which the diaphragm control circuit 25 is controlled to stop down the diaphragm of the zoom lens 2 in accordance with the calculated exposure value is performed (step S29).

Thereafter, the film wind motor 28 is driven to rotate in a forward direction via the film wind circuit 27 to wind the film by one frame (step S31). However, after the last frame of the film is exposed, the film wind motor 28 is driven to rotate in a reverse direction via the film wind circuit 27 to rewind the film. Thereafter control ends.

Figure 10:
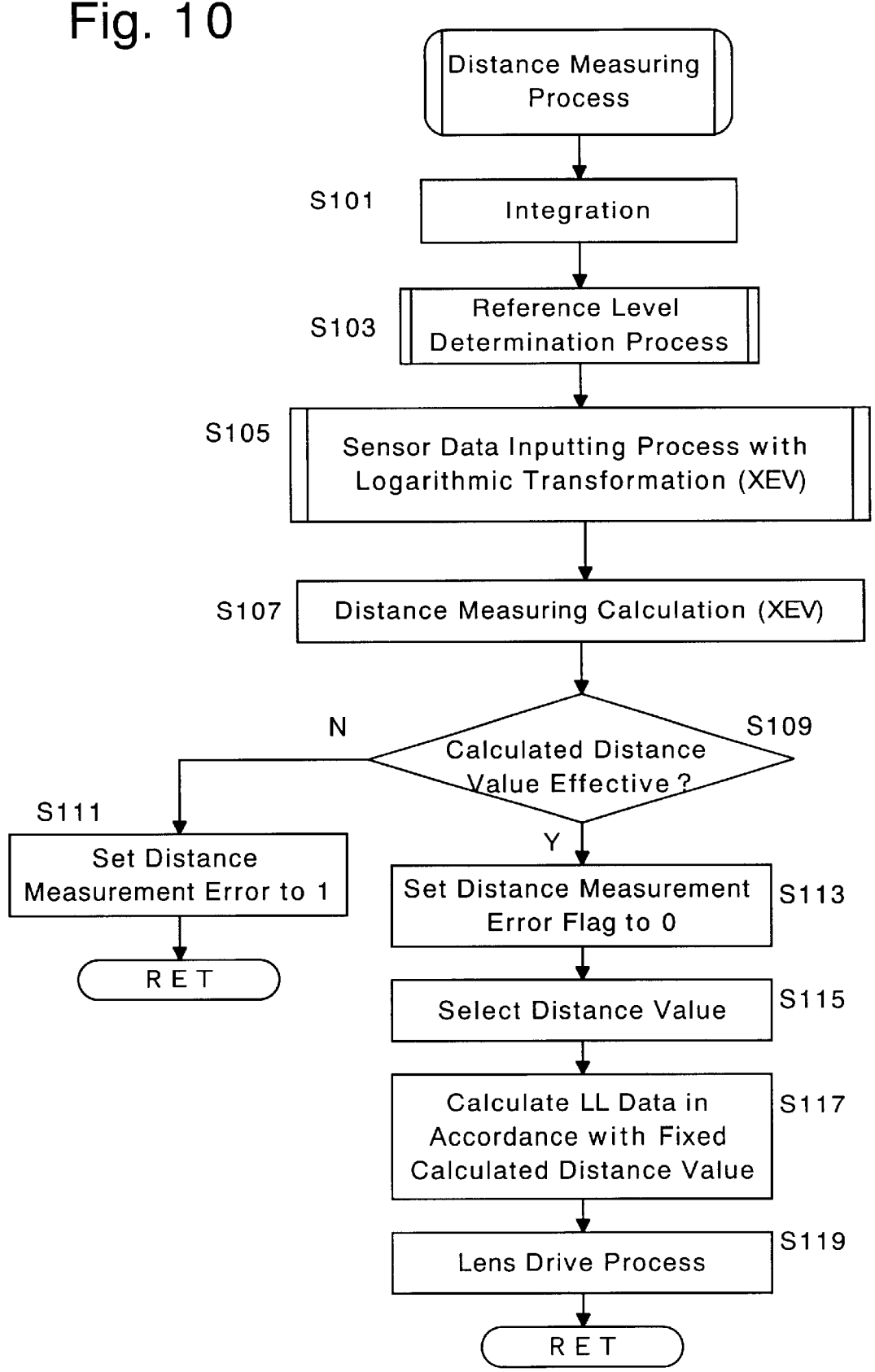
FIG. 10 is a flow chart showing the distance measuring process performed in the photographing process shown in FIG. 9.

The distance measuring process performed at step S13 in FIG. 9, will be hereinafter discussed in detail with reference to FIG. 10.

In this process, the distance measuring sensor 36 begins integration (step S101). During the integration process performed by the distance measuring sensor 36, a reference level determination process is carried out (step S103); the sensor data input process (the sensor data input process with logarithmic transformation) is carried out when a picture data reaches an integration completion value (step S105) to thereby obtain sensor data; and the distance measuring calculation is carried out based on the sensor data (step S107).

In the reference level determination process, the reference level XEV is determined in accordance with the difference of the photometering data of the photometering zones that overlap the distance measuring zones, as will be discussed hereinafter. In the sensor data input process, the sensor data is subject to 10-bit A/D conversion; the range of logarithmic transformation is set in accordance with the reference level XEV obtained at step S103; and logarithmic transformation is carried out in the logarithmic transformation range, as will be discussed hereinafter. In the illustrated embodiment, the 10-bit digital image data is logarithmically transformed into 8-bit sensor data.

Thereafter, it is determined whether or not the values of the object distance obtained in the distance measuring calculation are effective (step S109). In the illustrated embodiment, when the reliability of the calculated value is above a predetermined value, the value is judged effective. If no effective value is obtained, a measurement error flag is set to '1', and control is returned (step S111). If an effective distance value is obtained, the measurement error flag is set to '0' (step S113), and a calculated distance value which meets the predetermined conditions is selected (step S115). Consequently, the LL data is calculated based on the selected distance value (step S117), so that the lens drive process is performed in accordance with the LL data thus obtained, and control is returned (step S119).

Figure 11:
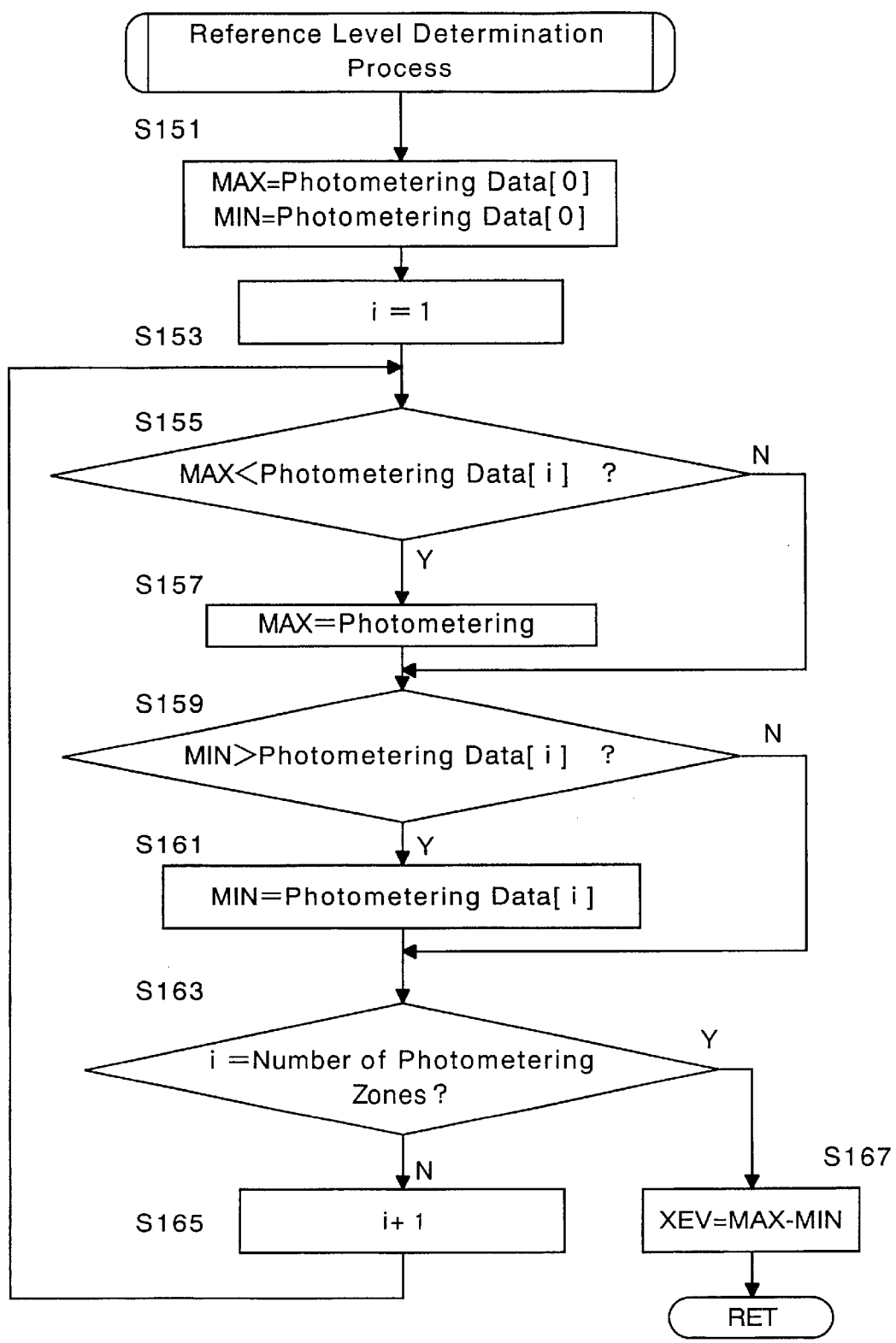
FIG. 11 is a flow chart of a reference level determination process of a logarithmic transformation performed in the distance measuring process shown in FIG. 10.

The reference level determination process which is carried out at step S103 will be discussed below with reference to the flow chart shown in FIG. 11. In this process, photometering data corresponding to the maximum and minimum brightness values MAX and MIN are detected from among the photometering data stored in the RAM 21c at step S11 and a difference between the MAX and MIN is set as the reference level XEV.

In this process, the photometering data [0] is read out of the RAM 21c and is set as MAX and MIN (S151), and the variable i is set to 1. The variable i represents the number to identify the photometering zones 'x', 'y', and 'z', and the $i^{th}$ photometering data stored in the RAM 21c is represented by photometering data [i].

Thereafter, the operations from steps S155 through S165 are repeated to detect the MAX and MIN values until variable i equals the total number of the photometering zones (until i=3 in the present embodiment). Namely, at step S155, it is determined whether or not the photometering data [i] is greater than the MAX stored in the RAM 21c. If it is determined at step S155 that the photometering data [i] is greater than MAX, the MAX value is replaced by the photometering data [i], and the new MAX value (i.e., photometering data [i]) is stored in the RAM 21c; thereafter, the control proceeds to step S159 (step S157). If it is determined at step S155 that the photometering data [i] is not greater than MAX, control skips step S157 and proceeds to step S159. At step S159, it is determined whether or not the photometering data [i] is smaller than the MIN stored in the RAM 21c. If it is determined at step S159 that the photometering data [i] is smaller than MIN, the MIN value is replaced by the photometering data [i], and the new MIN value (i.e., photometering data [i]) is stored in the RAM 21c (step S161). If it is determined at step S159 that the photometering data [i] is not smaller than MIN, control skips step S161. Thereafter, variable i is compared with the number of the photometering zones overlapping the distance measuring zones that is pre-stored in the RAM 21c (step S163). If it is determined at step S163 that variable i is not identical to the stored number, variable i is incremented by 1, and control returns to step S155 (step S165).

If it is determined at step S163 that variable i is identical to the number of the photometering zones overlapping the distance measuring zones, a difference between MAX and MIN is obtained by subtracting MIN from MAX, the difference is stored as the reference level XEV in the RAM 21c, and control returns (step S167). In the illustrated embodiment, during the A/D conversion and logarithmic transformation of one picture signal, the subsequent picture signal is A/D-converted.

Figure 12:
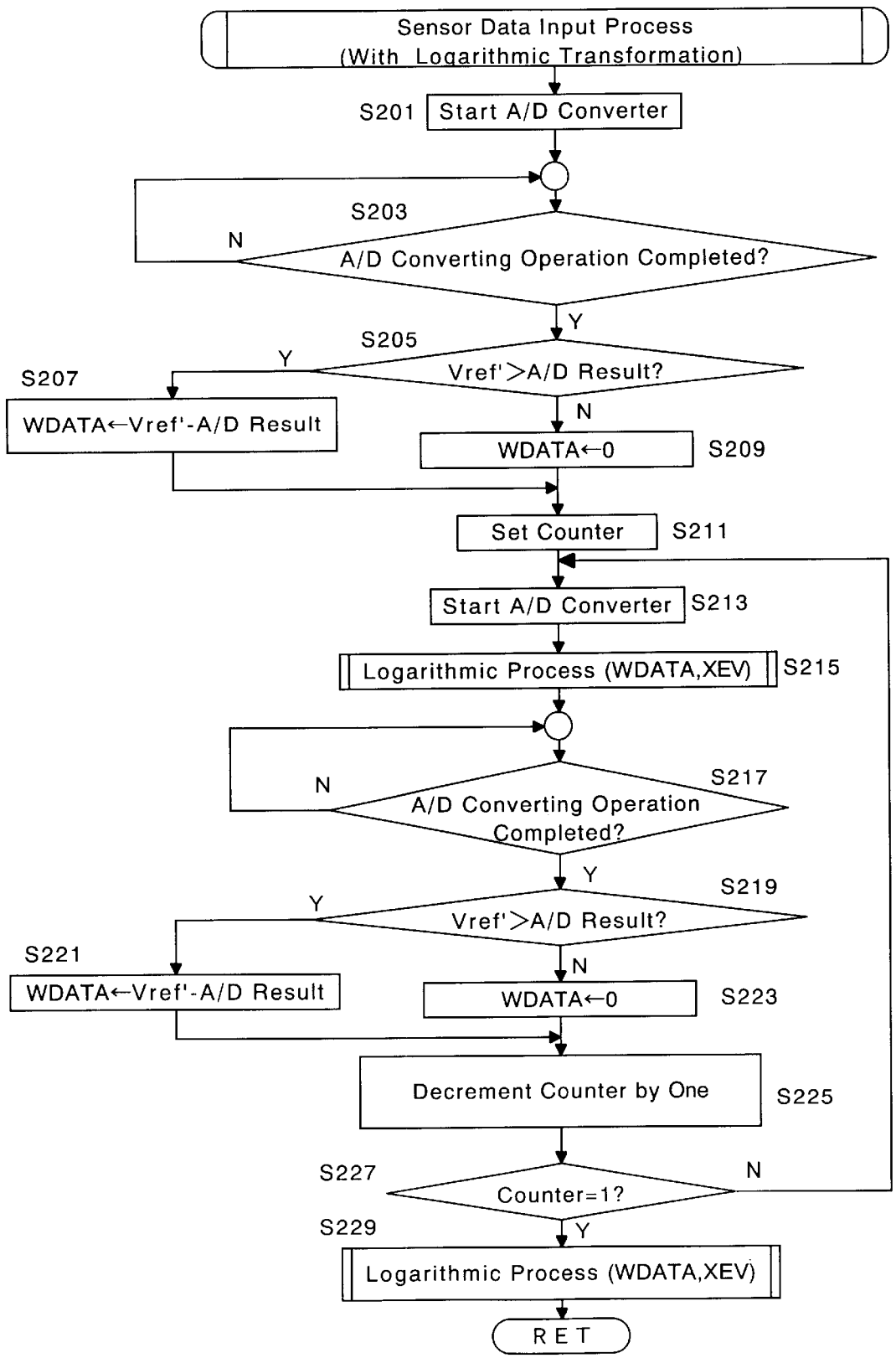
FIG. 12 is a flow chart showing the sensor data input process performed in the distance measuring process shown in FIG. 10.

The sensor data input process performed at step S105 will be hereinafter discussed in detail with reference to FIG. 12 and the graph shown in FIG. 7B.

In the sensor data input process, firstly, the A/D converter 21a is started to convert the picture signal that is input first from the photodiodes 36c of the distance measuring sensor 36 into a 10-bit digital form, so as to obtain the corresponding digital image data (A/D result) (step S201). The lower the object brightness, the greater the picture signal and the corresponding digital image data (A/D value), as can be seen in FIG. 7B. Subsequently, it is determined whether the A/D converter 21a has completed the A/D converting operation for the first input picture signal (step S203). Upon completion of the A/D conversion in the operation at step S201, it is determined whether the value of the digital image data is smaller than an A/D converted reference voltage (10-bit reference voltage value) Vref' of the reference voltage Vref (step S205). In the illustrated embodiment, the value of zero volts (0V) and the value of the 10-bit reference voltage value Vref' are determined as 0 and 1023, respectively.

If it is determined at step S205 that the digital image data is smaller than the 10-bit reference voltage value Vref', the value obtained by subtracting the value of the digital image data from the 10-bit reference voltage value Vref' is stored in the RAM 21c as a WDATA value (step S207). If it is determined at step S205 that the digital image data is equal to or greater than the 10-bit reference voltage value Vref', 0 (zero) is stored in the RAM 21c as the WDATA value (step S209). Hence, the WDATA value becomes smaller as the object brightness of the corresponding portion becomes lower.

Subsequently, the counter 21b is set to the total number of items of the digital image data (step S211). Subsequently the A/D converter 21a is started to convert the picture signal that is subsequently input from each subsequent photodiode 36c of the distance measuring sensor 36 into 10-bit digital form so as to obtain corresponding digital image data (step S213). Subsequently, a logarithmic process (shown in FIGS. 13A and 13B) is performed during the time the subsequent picture signal is input and converted into 10-bit digital form (step S215).

The logarithmic process is carried out to logarithmically transform the WDATA value stored at step S207 or step S209 into 8-bit data, corresponding to the reference level XEV obtained at step S167.

Subsequently, it is determined whether the A/D converter 21a has completed the A/D converting operation thereof for the current picture signal (step S217). If it is determined at step S217 that the A/D converter 21a has not yet completed, the A/D converting operation thereof for the current picture signal, control repeats the operation at step S217 to wait for the A/D converter 21a to complete the A/D converting operation thereof for the current picture signal. Furthermore, the steps S213 through S217 allows the A/D converter 21a to convert the current picture signal while the logarithmic process is simultaneously performed.

If it is determined at step S217 that the A/D converter 21a has completed the A/D converting operation thereof for the current picture signal, operations similar to the operations at steps S205, S207 and S209 are performed. Namely, it is determined at step S219 whether the value of the digital image data is smaller than the 10-bit reference voltage value Vref'. If it is determined at step S219 that the digital image data is smaller than the 10-bit reference voltage value Vref', the value obtained by subtracting the value of the digital image data from the 10-bit reference voltage value Vref' is stored in the RAM 21c as the WDATA value (step S221). If it is determined at step S219 that the digital image data is equal to or greater than the 10-bit reference voltage value Vref', 0 (zero) is stored in the RAM 21c as the WDATA value (step S223). After the operation at step S221 or S223, the counter value of the counter 21b is decremented by one (step S225). Subsequently, it is determined whether the counter value of the counter 21b is 1 (step S227). If it is determined at step S227 that the counter value of the counter 21b is not 1, control returns to step S213 so that the operations at step S213 through step S227 are repeated. If it is determined at step S227 that the counter value of the counter 21b is 1, the logarithmic transformation is performed wherein the digital image data obtained when the value of the counter is 2 (i.e., the last digital image data) is logarithmically transformed in accordance with the reference level XEV (step S229). Thereafter control returns to the distance measuring process shown in FIG. 10.

Figure 13A:
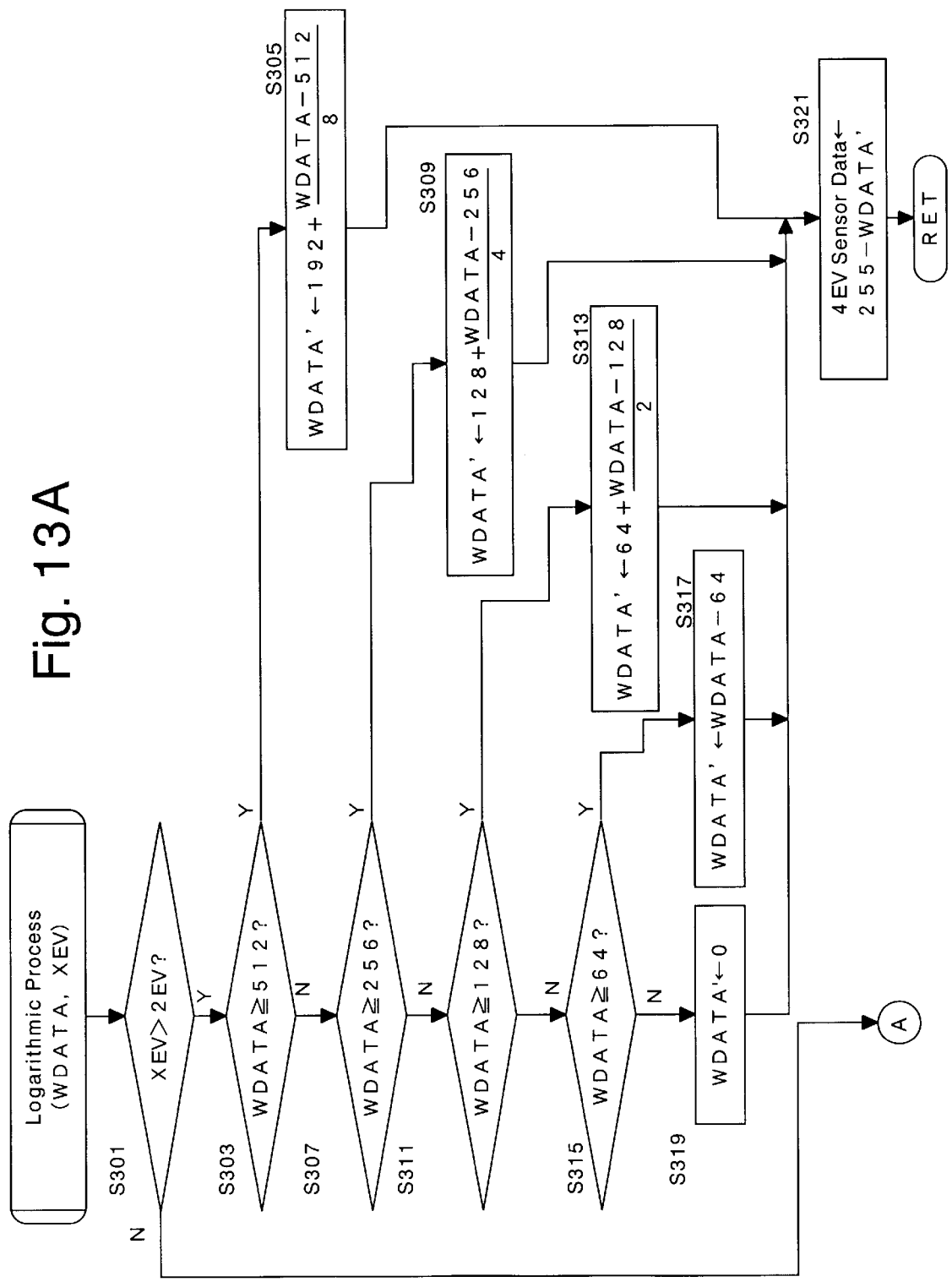
FIGS. 13A and 13B are flow charts showing the logarithmic process performed in the sensor data input process shown in FIG. 12.
Figure 13B:
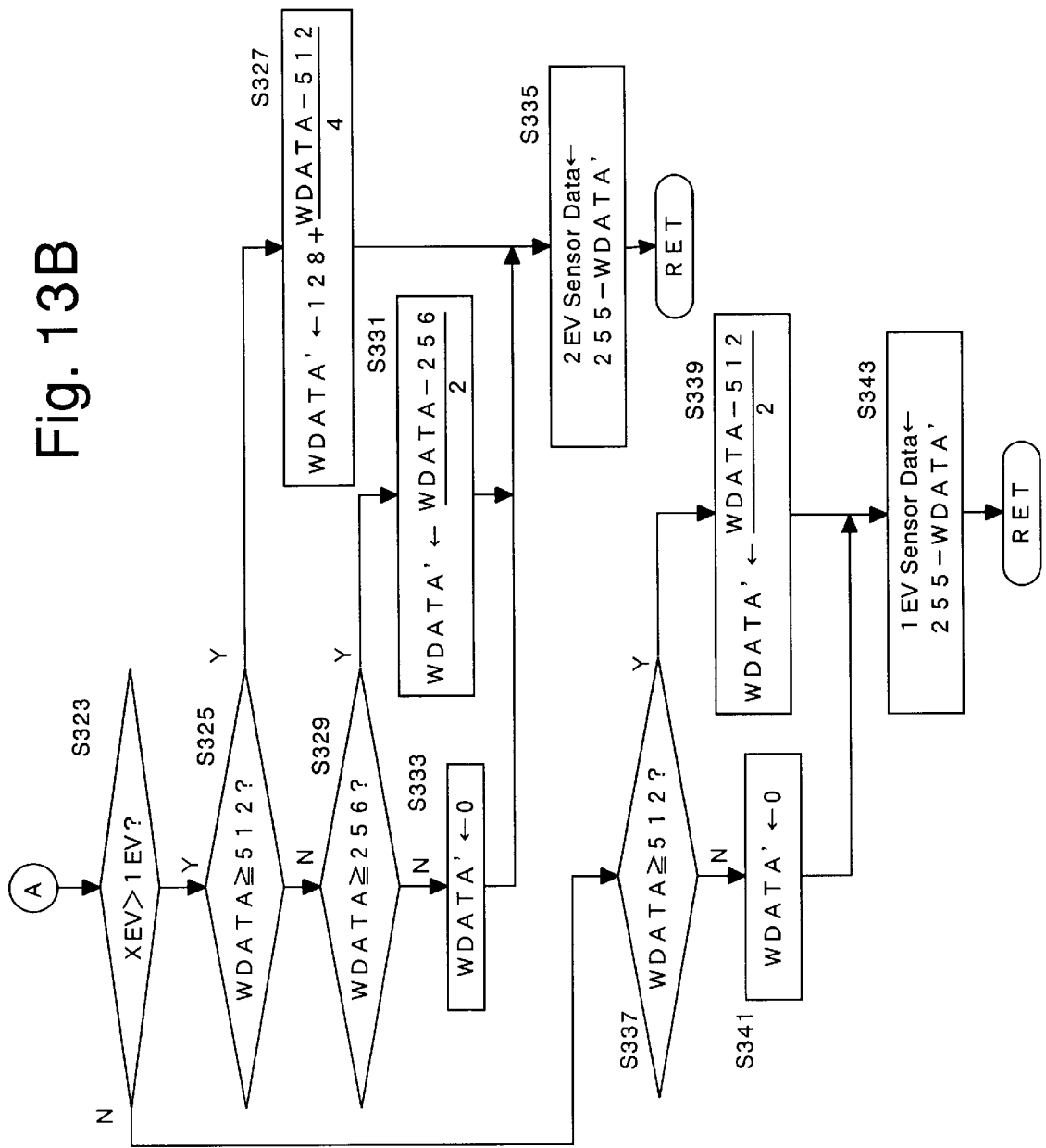

The logarithmic process performed at steps S215 and S229 will be hereinafter discussed in detail with reference to the flow chart shown in FIGS. 13A and 13B and the graphs shown in FIGS. 7B and 7C.

In the illustrated embodiment, the 10-bit digital image data is subject to the 4EV or 2EV or 1EV logarithmic transformation in accordance with the reference level XEV determined in the reference level determination process (FIG. 11) to obtain 8-bit, 4EV or 2EV or 1EV sensor data which is stored in the RAM 21c.

In this process, firstly, whether or not the reference level XEV is greater than 2EV is checked (step S301). If it is determined at step S301 that the reference level XEV is greater then 2EV, control proceeds to step S303 in order to carry out the 4EV logarithmic transformation which enhances the resolving power of the low brightness portion.

In the 4EV logarithmic process, firstly it is determined whether the WDATA value is equal to or greater than 512 (step S303). If the WDATA value is equal to or greater than 512, the value obtained by a formula "192+(WDATA value−512)/8" is determined herein as a WDATA' value (step S305), and then the value obtained by subtracting the WDATA' value from255 is stored in the RAM 21c as the 4EV sensor data (step S321) . Thereafter control returns to the sensor data input process shown in FIG. 12.

If it is determined at step S303 that the WDATA value is smaller than 512, control proceeds to step S307 at which it is determined whether the WDATA value is equal to or greater than 256. If the WDATA value is equal to or greater than 256, the value obtained by a formula "128+(WDATA value−256)/4" is determined herein as the WDATA' value (step S309), and then the value obtained by subtracting the WDATA' value from 255 is stored in the RAM 21c as the 4EV sensor data (step S321). Thereafter control returns to the sensor data input process shown in FIG. 12.

If it is determined at step S307 that the WDATA value is smaller than 256, control proceeds to step S311 at which it is determined whether the WDATA value is equal to or greater than 128. If the WDATA value is equal to or greater than 128, the value obtained by a formula "64+(WDATA value−128)/2" is determined herein as the WDATA' value (step S313), and then the value obtained by subtracting the WDATA' value from 255 is stored in the RAM 21c as the 4EV sensor data (step S321). Thereafter control returns to the sensor data input process shown in FIG. 12.

If it is determined at step S311 that the WDATA value is smaller than 128, control proceeds to step S315 at which it is determined whether the WDATA value is equal to or greater than 64. If the WDATA value is equal to or greater than 64, the value obtained by a formula "WDATA−64" is determined herein as the WDATA' value (step S317), and then the value obtained by subtracting the WDATA' value from 255 is stored in the RAM 21c as the 4EV sensor data (step S321). Thereafter control returns to the sensor data input process shown in FIG. 12.

If it is determined at step S315 that the WDATA value is smaller than 64, control proceeds to step S319 at which the WDATA' value is determined herein as 0, and then the value obtained by subtracting the WDATA' value from 255 is stored in the RAM 21c as the 4EV sensor data (step S321). Thereafter control returns to the sensor data input process shown in FIG. 12.

Accordingly, as can be seen in FIG. 7C, the 4EV sensor data corresponding to the digital image data on any photodiode of which the object brightness is lower than that of the digital image data on the photodiode (36c) 'a' is 255.

With the operations mentioned above, the resolving power of the low brightness portion is increased and hence the focus state of the object in each distance measuring zone can be easily detected.

However, at step S301, if the reference level XEV is not greater than 2EV, whether or not the reference level XEV is greater than 1EV is checked (step S323). If the reference level XEV is greater than 1EV, there is a possibility that the resolving power of the high brightness portion becomes too low when the 4EV logarithmic transformation is carried out. Therefore, control proceeds to step S325 in order to carry out the 2EV logarithmic transformation (which is narrower in the transformation range than the 4EV logarithmic transformation).

In the 2EV logarithmic process, firstly it is determined whether the WDATA value is equal to or greater than 512 (step S325). If the WDATA value is equal to or greater than 512, the value obtained by the formula "128+(WDATA−512)/4" is determined as the WDATA' (step S327), and the value obtained by subtracting the WDATA' value from 255 is stored in the RAM 21c as the 2EV sensor data (step S335). Thereafter, control returns to the sensor data input process shown in FIG. 12.

If it is determined at step S325 that the WDATA value is smaller than 512, control process to step S329 at which it is determined whether the WDATA value is equal to or greater than 256. If the WDATA value is equal to or greater than 256, the value obtained by the formula "(WDATA−256)/2" is determined as the WDATA' value (step S331), and then the value obtained by subtracting the WDATA' value from 255 is stored in the RAM 21c as the 2EV sensor data (step S335) . Thereafter, control returns to the sensor data input process shown in FIG. 12.

If it is determined at step S329 that the WDATA value is smaller than 256, control proceeds to step S333 at which the WDATA' value is determined as 0, and then the value obtained by subtracting the WDATA' from 255 (i.e., 255) is stored in the RAM 21c as the 2EV sensor data (step S335) . Thereafter, control returns to the sensor data input process shown in FIG. 12.

Accordingly, as can be seen in FIG. 7D, the 2EV sensor data of the picture data 'c' and the picture data 'a' and 'b' which represent brightnesses lower than the picture data 'c' are all 255. As a result of the operations at steps S323 through S333, the resolving power of the low brightness portion and the resolving power of the high brightness portion are almost identical and accordingly, the focus state of the object in each distance measuring zone can be easily checked.

However, at step S323, if the reference level XEV is not greater than 1EV, it is considered that there is little brightness difference between the distance measuring zones, and accordingly, control proceeds to step S337 in order to carry out the 1EV logarithmic transformation (which is narrower in the transformation range than the 2EV logarithmic transformation).

In the 1EV logarithmic process, firstly it is determined whether the WDATA value is equal to or greater than 512 (step S337). If the WDATA value is equal to or greater than 512, the value obtained by the formula "(WDATA−512)/2" is determined as WDATA' (step S339), and the value obtained by subtracting the WDATA' value from 255 is stored in the RAM 21c as the 1EV sensor data (step 343). Thereafter, control returns to the sensor data input process shown in FIG. 12.

If it is determined at step S337 that the WDATA value is smaller than 512, control proceeds to step S341 at which the WDATA' value is determined as 0, and then the value obtained by subtracting the WDATA' value from 255 (i.e., 255) is stored in the RAM 21c as the 1EV sensor data (step S343). Thereafter, control returns to the sensor data input process shown in FIG. 12.

Accordingly, as can be seen in FIG. 7E, the 1EV sensor data of the picture data 'd' and the picture data 'a', 'b', and 'c' which represent brightnesses lower than the picture data 'd' are all 255. As a result of the operations at steps S337 through S343, the resolving power of the high brightness portion is increased, and accordingly, the focus state of the object in each distance measuring zone can be easily checked.

As can be understood from the foregoing, in this embodiment, the maximum and minimum values are obtained from among the photometering data of the photometering zones that overlap the distance measuring zones, and the logarithmic transformation range in which the resolving power of the sensor data can be enhanced can be set based on the reference level XEV (difference between the maximum and minimum values of the photometering data). Therefore, sensor data of high contrast can be obtained for each distance measuring zone. Moreover, since the object distance is calculated based on the sensor data of high contrast, not only can the accuracy of the measurement be increased, but also it is not necessary to repeatedly perform the distance calculation using the sensor data having different logarithmic transformation ranges, thus resulting in reduced time for calculating the distance.

Although the logarithmic transformation is performed so that 10-bit digital image data is compressed into 8-bit data, the present invention is not limited solely to this particular embodiment. For instance, the logarithmic transformation can be performed so that 10-bit digital image data is converted into another 10-bit data, or the logarithmic transformation can be performed so that 8-bit digital image data is converted into another 8-bit data.

Although the illustrated embodiment is applied to a passive-type distance measuring apparatus provided in a lens shutter type AF camera, the illustrated embodiment can be applied to a passive-type distance measuring apparatus provided in an SLR AF camera.

As can be understood from the above discussion, according to the present invention, since the logarithmic transformation is carried out at the transformation range corresponding to the difference in the photometering data of the photometering zones that overlap the distance measuring zones, the object distance can be calculated based on the sensor data of high contrast. Consequently, not only can the accuracy of the measurement be increased, but also the time for calculation of the object distance can be reduced since it is not necessary to repeatedly perform the distance calculation using the sensor data having different logarithmic transformation ranges.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A distance measuring apparatus for a camera having a photometering device with a plurality of photometering zones that measure a brightness of an object, comprising:
    a light receiving device provided with a plurality of distance measuring zones, each photometering zone being arranged to conduct a photometering operation for each distance measuring zone, said light receiving device including an array of photoelectric conversion elements that convert light received thereon into an electric charge that is accumulated, the accumulated electric charges being output in order from each photoelectric conversion element as an analog picture signal of the light receiving device;
    an A/D converter that converts the analog picture signal into digital image data;
    a transformation range setting device that sets a transformation range corresponding to photometering data of the photometering zones that overlap the distance measuring zones; and
    a logarithmic transformation device that performs a logarithmic transformation on the digital image data at said set transformation range to obtain sensor data.

2. The distance measuring apparatus of claim 1, further comprising an integration control device that causes the photoelectric conversion elements to commence an integration process and terminates the integration of all the photoelectric conversion elements when any integral value of a plurality of integral values of the photoelectric conversion elements reaches a predetermined integration completion value, so that all of the integral values at the termination of the integration process can be output as said analog picture signal.

3. The distance measuring apparatus of claim 1, wherein said transformation range setting device determines maximum and minimum values of the photometering data of the photometering zones that overlap the distance measuring zones, and sets the transformation range in accordance with a difference between the maximum and minimum values.

4. The distance measuring apparatus according to claim 3, wherein said transformation setting device reduces the transformation range as the difference between the maximum and minimum values is decreased.

5. The distance measuring apparatus of claim 3, wherein said transformation setting device sets the transformation range to increase a resolving power of a high brightness portion of said digital image data as the difference between the maximum and minimum values is decreased.

6. The distance measuring apparatus for a camera according to claims 1, wherein said transformation range setting device sets the transformation range while an integration process is carried out by the light receiving device.

7. The distance measuring apparatus for a camera according to claim 6, wherein said light receiving device is arranged so that each of the distance measuring zones overlaps at least a portion of a corresponding photometering zone.

8. The distance measuring apparatus for a camera according to claim 6, wherein said light receiving device is arranged so that each of the distance measuring zones overlaps a center portion of a corresponding photometering zone.

9. The distance measuring apparatus for a camera according to claim 7, further comprising a calculation device which calculates an object distance based on said sensor data.

10. A camera, comprising:
    a photometering device that measures a brightness of an object in a plurality of photometering zones;
    a light receiving device provided with a plurality of distance measuring zones, each photometering zone being arranged to conduct a photometering operation for each distance measuring zone, said light receiving device including an array of photoelectric conversion elements that converts light received thereon into an electric charge that is accumulated, the accumulated electric charge being output in order from each photoelectric conversion element as an analog picture signal of the light receiving device;
    an A/D converter that performs an A/D conversion of the analog picture signal to obtain digital image data;
    a transformation range setting device that sets a transformation range corresponding to photometering data of the photometering zones that overlap the distance measuring zones;
    a logarithmic transformation device that performs logarithmic transformation on the digital image data at said set transformation range to obtain sensor data; and
    a calculation device that calculates an object distance based on said obtained sensor data.

* * * * *